United States Patent [19]

Nixon

[11] Patent Number: 4,625,109

[45] Date of Patent: Nov. 25, 1986

[54] OPTICAL ENCODER APPARATUS AND METHODS

[75] Inventor: Brian J. Nixon, Pleasanton, Calif.

[73] Assignee: Quantum Corporation, Milpitas, Calif.

[21] Appl. No.: 555,591

[22] Filed: Nov. 28, 1983

[51] Int. Cl.$^4$ ............................................. G01D 5/34
[52] U.S. Cl. ......................... 250/231 SE; 250/237 G
[58] Field of Search ..................... 250/231 SE, 237 G; 340/347 P; 356/395

[56] References Cited

U.S. PATENT DOCUMENTS

| | | |
|---|---|---|
| 3,400,275 | 9/1968 | Trump . |
| 3,633,038 | 1/1972 | Falk ................................. 250/231 R |
| 3,693,023 | 9/1972 | Wasserman .................... 250/231 SE |
| 3,693,024 | 9/1972 | Hulle et al. .................... 250/231 SE |
| 3,894,232 | 7/1975 | Laspesa .......................... 250/231 SE |
| 3,995,156 | 11/1976 | Angersbach et al. .......... 250/237 G |
| 4,075,478 | 2/1978 | Walker ........................... 250/231 SE |
| 4,117,320 | 9/1978 | Tomlinson et al. ............ 250/237 G |
| 4,135,217 | 1/1979 | Jacques et al. ......................... 360/77 |
| 4,152,589 | 5/1979 | Mitchell ......................... 250/231 SE |
| 4,184,071 | 1/1980 | Fryer et al. .................... 250/231 SE |
| 4,224,514 | 9/1980 | Weber ............................ 250/231 SE |
| 4,266,125 | 5/1981 | Epstein et al. ................. 250/231 SE |
| 4,345,149 | 8/1982 | Blaser ............................ 250/231 SE |
| 4,396,959 | 8/1983 | Harrison et al. ....................... 360/77 |

Primary Examiner—David C. Nelms
Assistant Examiner—James G. Gatto
Attorney, Agent, or Firm—Harrison, Harrison & Eakin

[57] ABSTRACT

An optical encoder apparatus is disclosed comprising a light source, a lens for focusing and collimating light emitted from the light source, a cap for receiving and aligning the light source and the lens, a scale movable relative to the cap including alternating opaque and translucent regions for blocking and transmitting light emitted from the light source, an array of a plurality of photodiodes for converting light emitted from the light source into electrical signals, a mask mounted in a fixed position between the scale and the photo transducer array, including in the mask alternating opaque and translucent regions arranged to act in concert with the movable scale to modulate the light received by the photo transducers, a mounting post for mounting the optical encoder apparatus, a receptor for attaching to the cap including a deck for receiving and aligning the photo transducer array, and including a cavity for receiving the mounting post, and a clamp for securing the receptor, and therefore the optical encoder apparatus, to the mounting post. The method for manufacturing the encoder apparatus is also disclosed and claimed.

23 Claims, 9 Drawing Figures

OPTICAL ENCODER APPARATUS AND METHODS

BACKGROUND OF THE INVENTION

This invention relates generally to optical encoders used for sensing the movement and position of a movable member relative to a fixed reference. More particularly, this invention relates to an optical encoder apparatus which houses and aligns the component parts thereof in a uniquely compact manner and to the methods of assembly and alignment thereof to provide for an improved encoder apparatus characterized by compactness, easier assembly, simplified adjustment, and improved operation, stability, and longevity without realignment, repair or replacement.

Optical position encoders capable of converting mechanical relative position into electrical signals are known in the art. Such devices have been employed as position sensors in servomechanisms, such as those used for positioning print wheels in printers, and for positioning read/write heads in rotating disk data storage devices.

Optical position encoders have generally comprised one or more light sources, a photo transducer array with a plurality of photo transducers and an overlying fixed mask aligned with the light source, and a movable scale of alternating opaque and translucent regions. Movement of the scale relative to and between the fixed mask and the light source has produced one or more light beams which alternate continuously between minimum and maximum intensity at the transducer. Each photo transducer translates the varying light beam it receives into an electrical signal having an amplitude proportional to light beam intensity. Polyphase signals from plural phase-aligned transducers have been used to ascertain the speed at which the scale is moving as well as scale position relative to the mask.

Signal peaks or phase boundaries generated by the encoder have been associated with significant system events such as arrival of a print wheel at a desired print strike position or arrival of a read/write head at a desired data track location. In systems which have employed this latter capability, the accuracy of the signal as an indication of scale position has been a critical consideration.

In the common assignee's U.S. Pat. No. 4,396,959 another optical encoder is disclosed, particularly in connection with FIG. 5 thereof. This structure utilized a vertical height adjusting screw to set the distance between the moveable scale and the fixed mask overlying the photodetector array. The critical alignment of the mask and the scale was adjusted by rotating the optical encoder assembly on a mounting post and tightening a second set screw. These two adjusting steps were interactive, requiring a time-consuming iterative process to attain correct adjustment during initial assembly and alignment.

Once possible source of phase error in the prior art shaft encoders was a misalignment of the rotating shaft or moveable member to which the movable scale was attached. This misalignment produced a perturbation in the position of the movable scale. In one prior patent, U.S. Pat. No. 4,224,514, to Weber et al. describing an optical shaft encoder, errors so produced were minimized by forming the scale of a thin, flexible stainless steel disk which was seated in a special guide formed by a surrounding rim and two thin mylar sheets disposed on either side of the stainless steel disk. The guide maintained the alignment of the disk relative to the fixed light source and photodetector array even in the event of a slight misalignment of the shaft to which the disk was attached.

In addition to the physical restraints imposed on the stainless steel disk, the Weber encoder limited the effect of shaft misalignment by specifying the physical locations of the photo transducers and by differentially combining the analog electrical signals produced therefrom in response to the varying light levels generated by movement of the movable scale. Two pairs of two photo transducers were provided, each pair being diagonally opposed on opposite sides of a radial line normal to and extending from the centerline of the shaft to which the movable scale is attached. The electrical signals from each opposed diagonal electrical pair was then electrically summed, so that the four photo transducers produced, in effect, two polyphase electrical signals. This arrangement was said to cancel effectively slight phase errors caused by minimal shaft misalignment from centerline.

The Weber encoder had the disadvantage of requiring a relatively complex electro-mechanical system to overcome possible signal phase errors. There was no simple adjustment in the Weber encoder to eliminate such errors. That system required multiple parts which had to be assembled and aligned, and which wore out with extended operation of the encoder.

In U.S. Pat. No. 4,266,125, to Epstein et al., an optical encoder was disclosed which attempted to lessen the adverse effects of eccentricity errors by a design which was relatively insensitive to such errors. This encoder required a complex arrangement of three light sources to produce light beams which were first collimated through three emitter lenses and which were subsequently split and focused by three detector lenses.

Other forms of modular optical shaft position encoders are described in the Angersbach et al. U.S. Pat. No. 3,995,156; the Fryer et al. U.S. Pat. No. 4,184,071; the Tomlinson et al. U.S. Pat. No. 4,117,320; and, the Wasserman U.S. Pat. No. 3,693,023. Each of these prior art approaches fails to provide a compact unitized encoder structure of the type achieved in the present invention.

Other prior art references considered in preparation of the application leading to this patent include the Laspesa U.S. Pat. No. 3,894,232; the Hulle et al. U.S. Pat. No. 3,693,024; the Trump U.S. Pat. No. 3,400,275; the Mitchell U.S. Pat. No. 4,152,589; the Walker U.S. Pat. No. 4,075,478; the Jacques et al. U.S. Pat. No. 4,135,217; and the Falk U.S. Pat. No. 3,663,038.

A hitherto unsolved need in the prior art was for a simple, easily adjustable optical encoder apparatus which does not require redundant components or complex electronics to eliminate phase errors; which is inherently stable, reliable, and resistant to wear; and, which provides an elegantly simple structure for improved manufacturing ease.

SUMMARY OF THE INVENTION WITH OBJECTS

One general object of the present invention is to povide an improved optical encoder apparatus and its method of manufacture, assembly and alignment which overcomes the limitations and drawbacks of the prior art approaches.

Another object of the present invention is to provide an optical encoder apparatus which is surprisingly compact and which requires a minimum number of component elements.

One more object of the present invention is to provide an improved optical encoder apparatus which may be mass produced, installed and aligned with a minimum of skill and effort devoted to mechanical assembly and alignment of its component parts.

A further object of the present invention is to provide an optical encoder apparatus which can be assembled comparatively rapidly with no corresponding sacrifice in quality of performance or accuracy.

Yet another object of the present invention is to provide an optical encoder apparatus which facilitates adjustments which may be required for final product assembly or for field maintenance operations by employing a single clamp enabling releasable securement for adjusting both vertical and horizontal-rotational dimension parameters.

Another important object of the present invention is to provide an optical encoder apparatus which is structurally simple and rugged, which is relatively inexpensive to manufacture, align, install and use, and one which resists degradation in peformance over time.

These objects are achieved in an improved optical encoder apparatus which comprises a two part housing including a cap and a receptor. The cap mounts a single light source and a collimating lens, andd the receptor mounts a phototransducer and a mask overlying the transducer. The two part housing includes mounting structure so that the cap and receptor mate and may be bonded into a unitary structure in a manner which positively aligns the light source, lens, mask and phototransducer relative to a single axis of rotation of the housing. A movable scale having a series of opaque and translucent regions enters a slot formed in the housing between the lens and the mask, and it interrupts the light beam in a manner which causes the photodetector to put out an analog voltage signal related to the position of the scale. The base of the encoder housing defines a cylindrical bore which is used to mount the encoder on a suitable mounting post. A releasable compression clamp encircles the base of the encoder and secures the encoder to the post. Loosening the clamp provides the ability to adjust the encoder apparatus both vertically and rotationally.

The method of the present invention includes the steps of:

(a) forming the housing of two parts, a cap and a receptor with the cap being formed to contain the light source and the receptor being formed to define a bore for engagingly fitting over a mounting post and to define a deck perpendicular to the bore for mounting the photodetector and mask in alignment thereon;

(b) forming the cap with a mounting structure including mounting surfaces adapted for engaging corresponding mounting structure formed on the receptor;

(c) forming the receptor with a mounting structure for receiving the mounting surfaces of the cap in a secure aligned relation thereon;

(d) assembling the cap by mounting the light source in the cap and connecting the light source to electrical connection means;

(e) assembling the receptor by mounting the transducer on the deck and connecting the transducer to electrical connection means and by then mounting the mask on the deck in overlaying relation with the transducer and in alignment with the axis of the bore;

(f) mounting the cap on the receptor to form the housing and to define a gap between the source and the mask for positioning therein a moveable scale having alternating opaque and translucent regions;

(g) mounting the housing in relation to the scale so that the scale is moveably positioned in the gap; and (h) aligning the housing in relation to the scale by vertical and rotational adjustments of the housing relative to the mounting post;

so that an encoder is manufactured wherein relative movement between the scale and the housing causes the detector to put out an electrical value indicative of scale position and velocity relative to the housing.

These and other objects, advantages, and features of the present invention will be further understood and appreciated from a consideration of the following detailed description of a preferred embodiment, presented with the accompanying drawings.

DETAILED DESCRIPTION OF A PREFERRED EMBODIMENT

Figure 1:
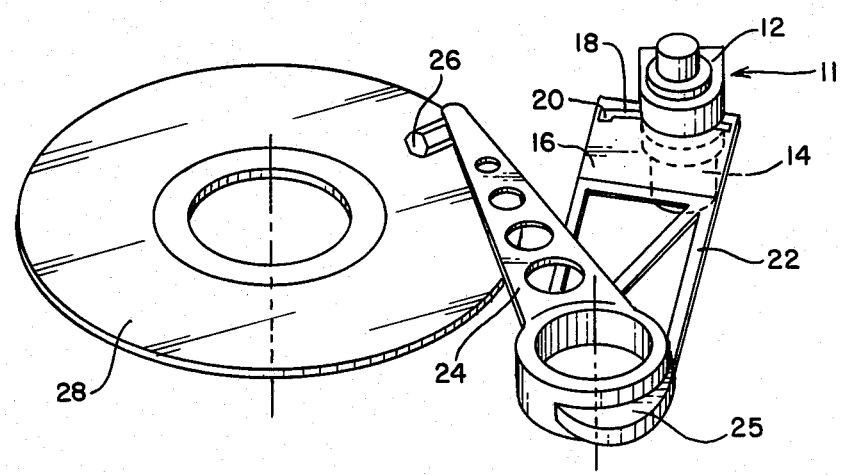
FIG. 1 is a diagrammatic depiction of a rotating disk data storage device using an optical position encoder incorporating the principles of the present invention.
Figure 2:
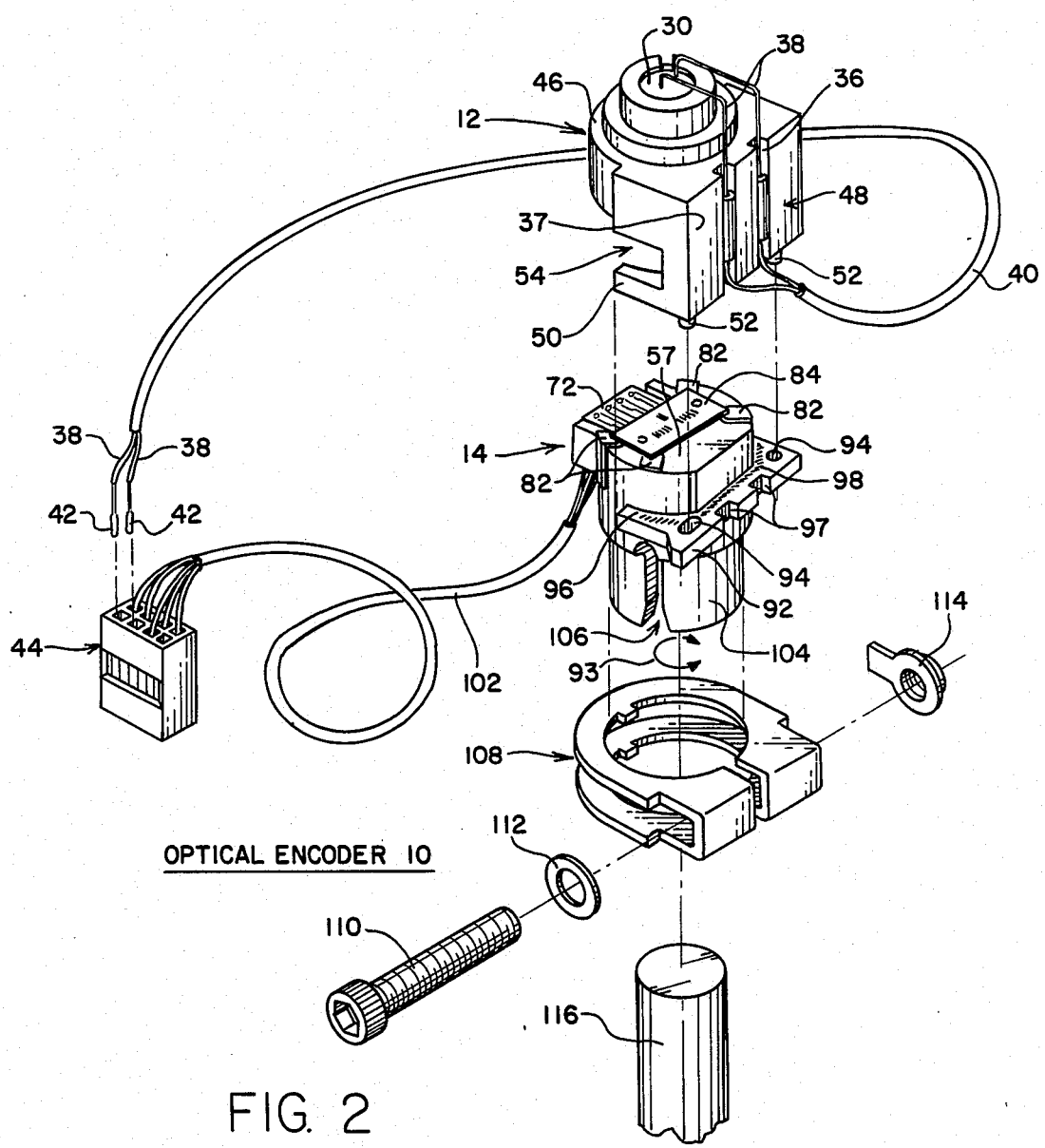
FIG. 2 is an exploded view in perspective of the housing of the optical encoder apparatus depicted in FIG. 1.
Figure 3:
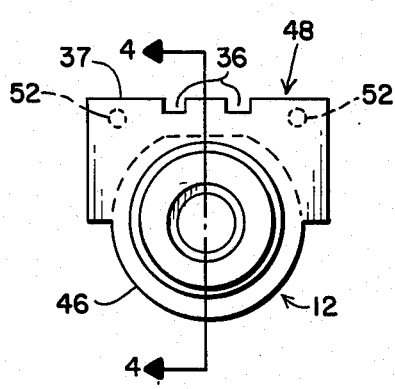
FIG. 3 is a top plan view of the cap portion of the housing depicted in FIG. 2.
Figure 4:
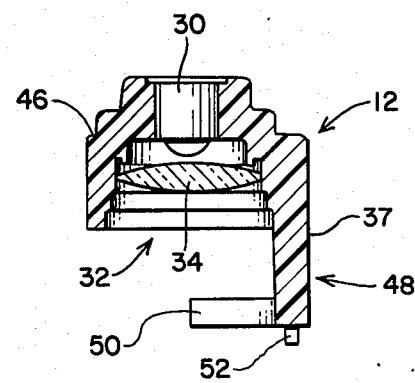
FIG. 4 is a side view in elevation and section of the cap portion depicted in FIG. 3 taken along the line 4—4 thereof.
Figure 5:
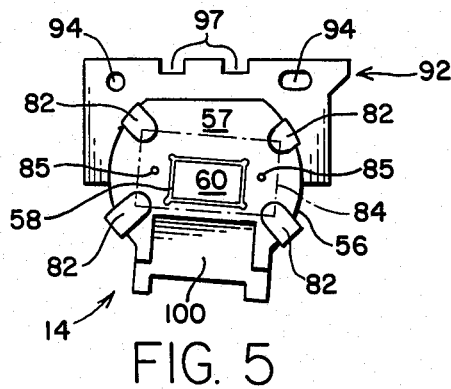
FIG. 5 is a top plan view of the receptor portion of the housing depicted in FIG. 2.
Figure 6:
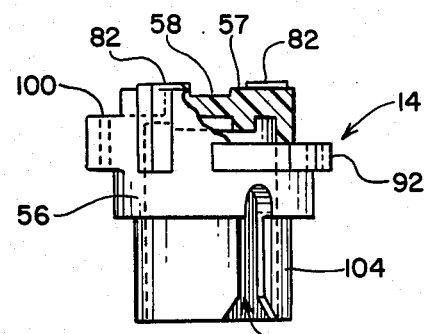
FIG. 6 is a side view in elevation of the receptor portion depicted in FIG. 5.
Figure 7:
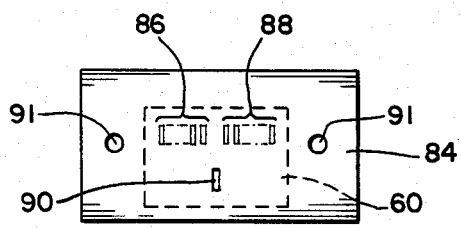
FIG. 7 is an enlarged plan view of the photodetector mask shown installed on the receptor in FIG. 2 with the underlying photodetector array shown in dashed lines.
Figure 8:
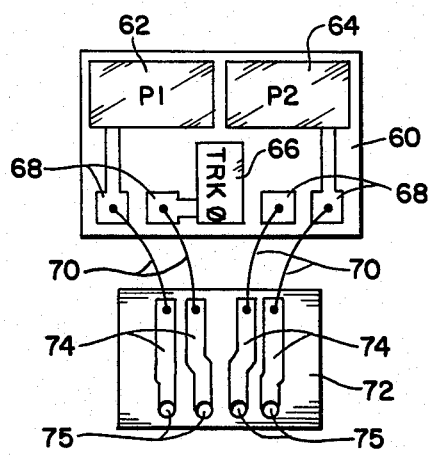
FIG. 8 is a plan view of the photodetector array and a small connection-providing printed circuit board which are respectively mounted on the top deck and a front mounting shelf of the receptor depicted in FIGS. 2, 5 and 6.
Figure 9:
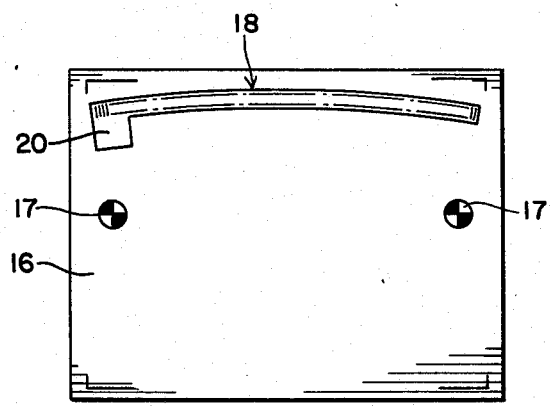
FIG. 9 is an enlarged plan view of the moveable scale depicted in FIG. 1 shown having deposited microlines thereon to define alternating translucent and opaque regions.

With reference to FIGS. 1 and 2, an optical encoder apparatus 10 incorporating the principles of the present invention is depicted within the environment of a rotating disk data storage device, shown diagrammatically in the figure. The encoder apparatus 10 includes a fixed unitary construction 11 formed of two parts, a cap 12 and a base receptor 14 to which the cap 12 is mounted. The apparatus 10 further comprises a moveable scale 16 having spaced apart silver microlines 18 deposited thereon to define alternating translucent and opaque regions. A single opaque region 20, e.g. at one periphery of the microline region, may be provided for determining optically a reference location relatively between the moving scale and the fixed unitary construction 11 which together provide the encoder 10. Although the microline pattern 18 is shown to be a sector or arc in FIG. 1, it will be understood that the present invention works well for linearly translating scales and for rotating annular scales on disks such as those employed as shaft encoders for rotating machinery making complete revolutions during operation.

In the FIG. 1 diagrammatic disk drive, the apparatus 10 is used as a position sensor in a data track servo system to sense positions defined to be track crossings marking the boundaries of data cylinder locations and also to provide a velocity signal during track seeking operations when moving from one track location to another track location. Thus, the disk drive is shown diagramatically as including for present purposes of explanation a support arm 22 for the glass scale 16, a rotatable head support structure 24 to which the support arm 22 is commonly fixed, a data transducer 26 for reading and writing data to data tracks at cylinder locations on a major surface of a rotating disk 28 carrying a magnetic storage media coating. A counterbalance 25 is provided for the head support structure and the support arm 22 to minimize loading of bearings mounting the structure 24 and a rotary prime mover (not shown) to a base structure (also not shown). Two alignment patterns 17 are provided on the scale 16 so that it may be precisely aligned by a jig and then bonded to the support arm 22 by a curable adhesive, such as epoxy. Further details of a disk drive data storage device advantageously utilizing the present invention may be found in the common assignee's copending U.S. patent application Ser. No. 06/444,523, filed Nov. 26, 1982, now abandoned.

Referring now to FIG. 2, the optical encoder apparatus 10 is shown in exploded assembly. Specific structural and assembly details of the elements comprising the apparatus 10 are set forth in FIGS. 3-9 and those figures should be considered in the present discussion, along with FIG. 2.

The cap 12 and the base receptor 14 are formed of suitable thermoplastic stock by injection molding. The cap 12 includes a single light source 30 comprising an infrared light emitting diode mounted in a recess formed to hold the LED. The light emitting region of the LED source 30 is directed downwardly in the hollow cylindrical interior 32 of the cap 12 and through a beam collimating lens 34 also mounted in a peripheral seat formed by the cap structure 12 within its interior region 32. Two connection wire recesses or channels 36 are formed in a planar rear exterior surface 37 of the cap 12 for the purpose of dressing and securing two LED connection wires 38 and providing convenient locations for securing the connections of the wires 38 to leads of a cable 40. The cable 40 includes connection pins 42 which seat within recesses of a plug 44 which facilitates connection of the apparatus 10 to further electrical signal processing circuitry, not shown.

The cap 12 includes an exterior cylindrical front portion 46 and an integral rear box portion 48. The box portion 48 includes the back surface 37 defining the channels 36, and it further includes two alignment legs 50 extending to the front from the back surface 37 at the lowermost region thereof and at locations on opposite sides thereof. Two cap alignment registration pins 52 are formed extending from a bottom surface of the box portion 48 adjacent the back surface 37 and the legs 50.

When the cap 12 is mounted to the receptor 14, a transverse gap 54 is defined between the lower edge of the cylindrical portion of the cap 12 and the surfaces of the alignment legs 50 and a top surface 57 of the receptor 14. This gap 54 accomodates the scale, and enables its translucent-opaque microline region to intercept the light beam from the LED source 30 and lens 34 on its way to a photodetector array 60.

The receptor 14 includes a cylindrical body 56 defining the top surface 57 which includes a central rectangular well 58 formed therein for receiving a monolithic integrated circuit photodetector array 60. The array 60 includes two photodiodes 62 and 64 which generate electrical phase signals P1 and P2 in quadrature phase relation (90 degrees phase shift) in response to varying intensities of the light beam as modified by the microlines 18 of the scale 16. A reference location diode 66 is also formed on the IC array 60 and it generates a reference signal when the light from the source 30 becomes completely blocked off by imposition of the opaque reference region 20 of the scale 16.

Metallized connection pads 68 are formed on the array 60 to facilitate connection of fine wires 70 to the photodetectors 62, 64 and 66 of the array 60. A small rectangular printed circuit board 72 is provided with connection lands and traces 74. The fine wires are bonded to the lands 74, and connecting wires of a cable 102 are also soldered to other connection locations 75 of the PCB 72.

The top surface 57 of the receptor 14 further defines four elevated bosses 82 which are generally aligned with and behind the four corners of the array well 58. These bosses 82 have a common planar dimension relative to and parallel with the top surface 57 of the receptor, and their function is to support a mask 84 which defines a pair of phase-offset parallel slot series 86 and 88. A single reference position slot 90 is also provided in the mask 84. The slot series 86 and 88, and the single reference slot 90, are defined as translucent regions of an otherwise silvered glass sheet providing the mask 84. The mask 84 further includes two alignment test patterns 91 so that it may be precisely aligned with respect to the axis of rotation 93 of the construction 11.

The receptor 14 includes a rectangular alignment shelf 92 which is symmetrical with the bottom surface of the box portion 48 of the cap 12. The shelf 92 defines alignment openings 94 for receiving the alignment pins 52 of the cap. It advantageously includes alignment surfaces 96 which receive and support the alignment legs 50 of the cap 12. The legs 50 include curved inner side regions which snugly fit around adjacent sidewall portions of the receptor 14, so that the cap 12 is precisely and correctly aligned with the receptor 14 in all three dimensions of possible relative alignment. Two slots 97 are formed in the rear side of the shelf 92, in alignment with the channels 36 of the cap 12, so that the LED wires 38 and cable 40 are not interfered with by the shelf 92.

A suitable adhesive 98 such as curable epoxy is applied to the top surface of the shelf 92, including the regions 96, and then the cap 12 is brought to and held in position by a jig until the adhesive cures and the cap becomes bonded to the receptor 14.

The receptor 14 is formed with a frontal shelf 100 which is stepped slightly below and is adjacent the well 58 for the array 60. The small PCB 72 is mounted to this frontal shelf in a position such that the fine wires 70 are of the shortest practical length possible, to minimize problems with the electrical connections they provide. As will be appreciated, the PCB 72 provides a very secured electrical connection between the array 60 and the cable 102 with the additional advantage of providing mechanical isolation between the wires of the cable 102 and the array 60 itself. The wires of the cable 102 include the same type of connection pins 42 as are used with the cable 40 for the LED source 30.

The receptor 14 further includes a lower cylindrical portion 104 to facilitate mounting of the apparatus 10 to a mounting post 116 secured to a base structure (not shown) which also supports the structure mounting the moveable scale 16. The cylindrical portion 104 includes a compression-enabling peripheral slot 106 extending through the cylindrical portion 104 in a direction generally parallel with the axis of rotation 93. A keyed U-shaped metal compression clamp 108 is provided to fit over the cylindrical portion 104. The clamp 108 compresses the portion 104 and enables it to be locked in proper alignment, both vertical and rotational, on the mounting post 116. The clamp includes a screw 110, a washer 112, and a locking nut 114.

The first assembly step for the construction 11, following formation of the cap 12 and receptor 14, is to bond the photodetector array 60 in the well 58 of the top surface 57 of the receptor 14. A drop of adhesive is placed in the well 58. An available IC array 60 is picked up by the assembler by a vacuum handling tool and then placed into the well. Pressure is then uniformly applied to the array 60 so that the adhesive spreads uniformly throughout the well and so that a proper planar alignment of the array 60 is achieved with respect to the receptor 14.

The next step is to glue the small PCB 72 to its shelf 100, following the same procedure which was followed for the array 60. It should be noted that the wires of the cable 102 should be soldered to the PCB 72 at the connection locations 75 before it is mounted to its shelf 100. The next step is to bond the fine wires between the connection lands 68 of the array 60 and the corresponding connection lands 74 of the PCB 72. Once this step is completed, the photocell array 60 may be tested to be sure that it is operating correctly and is within acceptable manufacturing tolerances.

A key step in the manufacturing process is the proper alignment of the mask 84 with respect to the axis of rotation 93 of the construction 11. To carry out this step a jig is provided which temporarily mounts the receptor 14. A master mask template is also provided in a pivoting frame portion of the jig. A mask 84 is placed on the raised bosses 82 of the jig-mounted receptor 14, and the mask 84 is held in place by clamps adjustable by vernier adjusting screws in two planar dimensions. An arm of the pivoting frame holding the master template is then folded down so that the master mask template comes into overlying general registration with respect to the mask 84 to be aligned. A light source is then provided for directing light beams through two small cylindrical alignment passages 85 extending through the receptor 14. The assembler then uses a microscope to align the alignment marks 91 on the mask 84 with corresponding reference marks on the master template by adjusting the vernier screws until precise alignment is reached. Then, the mask 84 is glued into place on the raised bosses 82 by careful application of an adhesive which wicks between the mask 84 and the raised mounting surface of each boss 82. The clamps are then released, and the mask-containing receptor 14 is removed from the jig.

The next step is to bond the collimating lens 34 to its peripheral seat formed in the interior of the cap 12. This step is followed by mounting the LED source 30 to the cap, and by then dressing and gluing the LED connecting wires 38 and cable 40 into the channels 36 on the backside 37 of the cap 12. Finally, the adhesive 98 is applied to the top surface of the alignment shelf 92, and the cap 12 is clamped in a jig and brought into precise position on the receptor 14 to complete the construction 11.

The clamp 108 is then assembled and positioned on the lower cylindrical portion 104 of the receptor 14. The construction 11 is then inspected, cleaned and packaged. It is ready for installation into the host system, such as the disk drive depicted in FIG. 1.

In operation, light is emitted from the LED source 30 through the collimating lens 34 and thereby directed towards the mask 84 and the underlying photodetector array 60. The mask 84 effectively blocks all light to the photodiodes 62 and 64, and the reference diode 66, except for such light as passes through the translucent regions between the microlines 18 of the scale 16. The scale 16 acts in combination with the mask 84 alternately to block and to enable transmission of light from the source 30 to each photodetector 62, 64, 66 of the array 60.

Each set of translucent slots 86 and 88 of the mask 84 comprises e.g. ten equidistant parallel light openings. The spacing of alternating opaque regions and translucent openings 88 over the photodetector 64 in relation to those openings 86 over the photodetector 62 is such that the light pattern produced is phase shifted to yield electrical analogs of light intensity which are in a predetermined phase relationship, e.g. quadrature (with a 90 degree phase shift). Other desired phase relations are completely acceptable and may be advantageously employed in the encoder 10 of the present invention.

The spacing of alternating opaque and translucent regions 18 in the scale 16 and slot series 86 and 88 in the mask 84 is set so that the physical distance represented by the change in electrical signals from one peak value to the next is a known value. The distance chosen is generally associated with a significant event in the host apparatus, such as arrival of a print wheel at a desired print strike location or the arrival of a data transducer assembly at a desired track boundary location. Such significant events may be derived by peak detection, axis zero crossing detection, or by comparing the relative magnitudes of the phase shifted signals, by using circuit techniques known to those skilled in the art.

Initial installation of the construction 11 on its host mounting post 116, and the scale 16 on its support arm 22, is performed in a manner intended to align the mask 84 with respect to the scale 16. However, disadvantageous combinations of individual element manufacturing tolerances may preclude correct initial alignment. In such a situation, the phase shift between the photodetector output signals would not accurately reflect the actual position of the scale 16 relative to the base.

The encoder apparatus 10 of the present invention compensates for these possible conditions in two ways: First, as already explained, the unitary construction 11 is secured in place upon the mounting post 116 by a single clamp 108. The clamp 108 may be easily loosened to enable both vertical and rotational repositioning and alignment. Rotational adjustment of the construction 11, and therefore the mask 84 contained therein, relative to the scale 16 has the desirable result of adjusting the phase shift between the light patterns reaching the two photodetectors 62 and 64 of the array 60 which yields a corresponding effect on the phase of the electrical analog signals put out therefrom. It should be noted, however, that the adjustment so provided can change the phase shift of the two signals in one direction only, regardless of the direction of rotation of the construction 11.

In the event that individual manufacturing tolerances combine to produce a particular construction 11 which cannot be adequately adjusted or aligned by the methods described herein, because of the discrete unitary character of the construction 11, one unit may be quickly removed and replaced with another unit not having the same cumulatively undesirable manufacturing tolerances. This ease of replacement provides the second method of compensation. The exchange of an unacceptable encoder construction 11 for an acceptable one would normally be accomplished at the time of manufacture. At that time the encoder 10 is checked to be sure that there is a sufficient range of adjustment to provide for any later recalibration or realignment that might become necessary with the aging of the components, etc. After installation and use, adjustments to the encoder 10 would normally be accomplished by the position adjustments already described.

Having thus described an embodiment of the invention, it will now be appreciated that the objects of the invention have been fully achieved, and it will be understood by those skilled in the art that many changes in construction and widely differing embodiments and applications of the invention will suggest themselves without departure from the spirit and scope of the invention. The disclosures and the description herein are purely illustrative and are not intended to be in any sense limiting.

I claim:

1. A method of manufacturing an optical encoder device including a scale, and a housing containing a light source, a photo transducer spaced apart from said light source and aligned for receiving a light beam therefrom, and a mask having opaque and translucent regions mounted over said transducer so that said opaque region shields said transducer from said light beam, said housing being mounted to a mounting post; said scale being positioned for relative movement between said source and said mask of said housing and having alternating opaque and translucent regions extending generally perpendicular to the locus of relative movement, said method comprising the steps of:
(a) forming said housing of two parts, a cap and a receptor, said cap being formed to contain said light source and said receptor being formed to define a bore for engagingly fitting over a mounting post and to define a deck perpendicular to said bore for mounting said photo transducer and mask in alignment thereon,
(b) forming said cap with a mounting structure including mounting surfaces adapted for engaging corresponding mounting structure formed on said receptor;
(c) forming said receptor with a mounting structure for receiving said mounting surfaces of said cap in a secure aligned mounting relation thereon;
(d) assembling said cap by mounting said light source in said cap and connecting said light source to electrical connection means;
(e) assembling said receptor by mounting said transducer on said deck and connecting said transducer to electrical connection means and by mounting said mask on said deck in alignment with the axis of said bore;
(f) mounting said cap on said receptor to form said housing and so as to define a gap between said source and said deck for positioning said scale therein; and,
(g) mounting said housing in relation to said scale so that said scale is moveably positioned in said gap
(h) aligning said housing in relation to said scale by vertical and rotational adjustment of said housing relative to said mounting post;
so that an encoder is manufactured wherein relative movement between said scale and said housing causes the transducer to put out an electrical value indicative of scale position and velocity relative to said housing.

2. The method of manufacture set forth in claim 1 wherein the step of forming said receptor includes the step of forming yieldable sides to define said bore, said yieldable sides providing for clamped fitting over said mounting post.

3. The method of manufacture set forth in claim 1 wherein the step of assembling said cap includes the steps of providing a collimating lens and mounting said lens between said light source and said transducer.

4. The method of manufacture set forth in claim 1 comprising the further step of forming a recessed well in said deck of said receptor, said well having dimensions insubstantially greater than those of the transducer, and mounting said transducer in said well.

5. The method of manufacture set forth in claim 1 wherein the step of mounting said mask on said receptor includes the steps of:
(a) forming insubstantially elevated bosses at peripheral locations of said deck and having raised surfaces lying substantially within the same plane parallel to the plane of said transducer and well, said raised surfaces having inside dimensions greater than those of said mask so that said mask may be precisely located with respect to and mounted at its periphery on said raised surfaces of said bosses, and
(b) locating and mounting said mask on said bosses.

6. The method of manufacture set forth in claim 1, wherein the step of aligning said mask with said receptor includes:
(a) forming elevated bosses at locations of said deck which correspond to peripheral regions of said mask when it is in correct alignment relative to said receptor,
(b) providing alignment passages through said receptor and corresponding alignment markings on said mask,
(c) providing a moveable alignment template on a template jig having a template mounting post and installing the receptor on said template mounting post,
(d) locating and mounting said mask on said bosses elevated above said deck by visually aligning said alignment markings on said mask with said markings on said template, by directing light beams through said alignment passages, thence through said alignment markings of said mask and finally through alignment markings of said template, and by adjusting the position of said mask on said bosses until said alignment markings of said mask come into alignment with said markings on said template, and (e) gluing said mask to said bosses once alignment thereof relative to said receptor has been achieved, and then removing said receptor from said template jig mounting post.

7. The method of manufacture set forth in claim 1 wherein the step of forming mounting structures on said cap and said receptor includes:
   (a) forming the mounting structures on said cap and said receptor to be complementary, one to the other,
   (b) forming at least one positioning pin on one of said complementary structures and
   (c) forming one or more dowel positioning pin bores on the other of said complementary mounting structures for receiving said positioning pins.

8. A method of manufacturing an optical encoder as recited in claim 6 wherein the step of forming complementary mounting structures on said cap and said receptor includes the step of forming said structures along dimensions aligned with as well as substantially perpendicular with the axis of said bore, so that said cap and said receptor are precisely aligned and fixedly positioned together in three dimensions of possible relative movement.

9. The method of manufacture set forth in claim 1 wherein the step of forming said receptor includes the steps of:
   (a) forming a shelf in said receptor adjacent to and substantially coplanar with said deck;
   (b) providing printed circuit board means having connection lands and wire holes in common with said lands;
   (c) providing electrical connection lands on said transducer;
   (d) connecting a connection cable to said wire holes;
   (e) mounting said circuit board means on said shelf;
   (f) interconnecting said connection lands of said circuit board means and said lands of said transducer with fine arcuate wires after said transducer has been affixed to said deck.

10. In an improved optical encoder having a housing containing, on a single axis, a single light source, a collimating lens, a photo transducer array and a mask means having alternating opaque and translucent regions in the form of microlines mounted for shielding the photo transducer array from the light source; and
    a movable scale having alternating opaque and translucent regions extending generally perpendicular to the locus of scale movement so that movement of the scale perpendicular to said axis causes the photo transducers to output phased electrical pulses indicative of scale position and velocity relative to said housing,
    the improvement comprising:
    (a) a two part housing including a cap and a receptor wherein the cap holds said single light source and said collimating lens and the receptor holds said photo transducer array and said mask, and
    (b) means for mounting said cap and said receptor as said two part housing so as to align said single light source, collimating lens, photo transducer array and mask relative to a single axis of rotation of said housing.

11. In an improved optical encoder as recited in claim 10 wherein the improvement further comprises:
    (a) said two part housing forming when assembled a "U" shaped slot perpendicular to and crossing said axis between said lens and said mask enabling passage of an edge region of said scale carrying said microlines therethrough and across said axis.

12. In an improved optical encoder as recited in claim 10 wherein the improvement comprising the means for forming said two part housing so as to align said single light source, collimating lens, photo transducer array and mask relative to said single axis further comprises complementary surfaces on said cap and said receptor such that mating said surfaces uniquely positions said cap relative to said receptor in three dimensions.

13. In an improved optical encoder as recited in claim 12 wherein the improvement comprising complementary surfaces on said cap and said receptor further comprises said surfaces being formed and extending relatively to each other in at least two dimensions which are substantially perpendicular with said single axis so that said cap and said receptor are positively aligned with respect to said axis by said surfaces coming into substantial bonding contact with each other.

14. In an improved optical encoder as recited in claim 12 wherein the improvement comprising complementary surfaces on said cap and said receptor such that mating said surfaces uniquely positions said cap relative to said receptor further comprises:
    (a) one or more positioning pins on one of said complementary surfaces, and
    (b) one or more positioning pin bores in said other complementary surface for receiving said positioning pins.

15. In an improved optical encoder as recited in claim 10 wherein the improvement further comprises:
    (a) a bore in said housing for adjustably mounting said housing on a stationary mounting post adjacent to the locus of movement of said scale, and
    (b) means for clamping the sides of said bore to said mounting post.

16. In an improved optical encoder as recited in claim 10 wherein the improvement further comprises:
    (a) a deck on said receptor, perpendicular to said axis, for mounting said photo transducer array and said mask.

17. In an improved optical encoder as recited in claim 16 wherein the improvement comprising a deck perpendicular to said axis for mounting said photo transducer array and said mask further comprises:
    (a) a well in said deck with dimensions insubstantially larger than said photo transducer array for containing and precisely positioning said photo transducer array in said receptor, and
    (b) bosses on said deck for confining and precisely positioning said mask over said photo transducer array.

18. In an improved optical encoder as recited in claim 10 wherein the improvement comprises:
    (a) said receptor having a shelf formed adjacent to and substantially coplanar with said deck;
    (b) printed circuit board means having connection lands and wire holes in common with said lands, said circuit board means being mounted to and supported by said shelf;
    (c) a connection cable being connected to said wire holes;
    (d) electrical connection lands on said array,
    (e) said connection lands of said circuit board means being interconnected with said lands of said array by fine arcuate connecting wires.

19. An optical position encoder having a light source means disposed on one side of a relatively movable scale arranged to indicate positional displacement, a solid state transducer array means disposed on the opposite side of a scale, a mask means disposed between the scale and the transducer array means in optical alignment with the scale, a housing comprising first and second portions adapted to be joined together, the first portion having means for receiving the light source means and the second portion having first means for receiving the transducer array means, a second means for receiving and aligning the mask means, and a third means substantially adjacent to said first means for receiving a support structure including at least wire bonding pads, said support structure being operatively connected to receive signals provided by said transducer array means by means of a plurality of curved wires extending from the transducer array means to the wire bonding pads on the support structure.

20. The optical encoder of claim 19 wherein the first means of the second portion of the housing is a well.

21. The optical encoder of claim 20 wherein the third means is a deck.

22. The optical encoder of claim 21 wherein the second means is a set of raised bosses arranged to as to contact at least a portion of the periphery of the mask means.

23. An optical encoder having a light source means disposed on one side of a scale, a transducer means disposed on the opposite side of a scale, a mask means disposed between the light source and the transducer in optical alignment with the scale, a housing comprising cap and receptor portions, the cap portion having means for receiving the light source means and the receptor portion having a well for receiving the transducer means, a set of elevated bosses for receiving the mask means and positioning the mask means in alignment with the transducer and the locus of movement of the scale, and a shelf means substantially adjacent to and coplanar with, but lower than, the well for receiving a support structure including at least wire bonding pads, said support structure being operatively connected to receive signals provided by said transducer by means of a plurality of curved wires.

* * * * *